United States Patent
Zhu

(10) Patent No.: US 12,052,766 B2
(45) Date of Patent: Jul. 30, 2024

(54) METHOD FOR DETERMINING CONTENTION WINDOW, AND COMMUNICATION DEVICE AND STORAGE MEDIUM

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 319 days.

(21) Appl. No.: 17/629,588

(22) PCT Filed: Jul. 26, 2019

(86) PCT No.: PCT/CN2019/098037
§ 371 (c)(1),
(2) Date: Jan. 24, 2022

(87) PCT Pub. No.: WO2021/016772
PCT Pub. Date: Feb. 4, 2021

(65) Prior Publication Data
US 2022/0279584 A1 Sep. 1, 2022

(51) Int. Cl.
*H04W 74/08* (2024.01)
*H04L 1/1607* (2023.01)
*H04L 1/1812* (2023.01)
*H04W 74/0833* (2024.01)

(52) U.S. Cl.
CPC ....... *H04W 74/0833* (2013.01); *H04L 1/1621* (2013.01); *H04L 1/1812* (2013.01)

(58) Field of Classification Search
CPC ......... H04W 74/0833; H04W 74/0841; H04W 74/08; H04W 74/0808; H04W 47/27; H04W 74/0816; H04L 1/1621; H04L 1/1812; H04L 1/1628; H04L 1/16; H04L 1/18
See application file for complete search history.

(56) References Cited

U.S. PATENT DOCUMENTS

| 2020/0100276 | A1* | 3/2020 | Oh | H04W 16/14 |
| 2020/0236709 | A1* | 7/2020 | Park | H04W 74/0816 |
| 2020/0383095 | A1* | 12/2020 | Moon | H04L 5/001 |
| 2021/0036811 | A1* | 2/2021 | Bhattad | H04L 1/1614 |

(Continued)

FOREIGN PATENT DOCUMENTS

| CN | 108886815 A | 11/2018 |
| CN | 109076601 A | 12/2018 |
| CN | 109314615 A | 2/2019 |

(Continued)

OTHER PUBLICATIONS

Japanese Patent Application No. 2022-504637, Office Action dated May 12, 2023, 4 pages.

(Continued)

*Primary Examiner* — Mewale A Ambaye
(74) *Attorney, Agent, or Firm* — Cozen O'Connor

(57) ABSTRACT

A method for determining a contention window. The method includes: determining a contention window size (CWS) of a random access contention window on an unlicensed frequency band based on a transmission block (TB) based reception feedback.

12 Claims, 8 Drawing Sheets

(56) References Cited

U.S. PATENT DOCUMENTS

2021/0105812 A1* 4/2021 Rastegardoost .......... H04L 1/08

FOREIGN PATENT DOCUMENTS

| KR | 20170093059 A | 8/2017 | |
| WO | WO-2019027271 A1 * | 2/2019 | ........... H04L 1/1819 |
| WO | WO 2019027271 A1 | 2/2019 | |
| WO | WO 2019139876 A1 | 7/2019 | |

OTHER PUBLICATIONS

Japanese Patent Application No. 2022-504637, English translation of Office Action dated May 12, 2023, 3 pages.

Chinese Patent Application No. 202110891443.4, Office Action dated Aug. 22, 2022, 4 pages.

Chinese Patent Application No. 202110891443.4, English translation of Office Action dated Aug. 22, 2022, 5 pages.

Intel Corporation "Channel access mechanism for NR-unlicensed" 3GPP TSG RAN WG1 Meeting #97, R1-1906785, May 2019, 18 pages.

European Patent Application No. 19939959.3, Search and Opinion dated Jun. 22, 2022, 7 pages.

Indian Patent Application No. 202247009857, Office Action dated Jul. 13, 2022, 5 pages.

Russian Patent Application No. 202247009857, Office Action dated Aug. 4, 2022, 8 pages.

Russian Patent Application No. 202247009857, English translation of Office Action dated Aug. 4, 2022, 7 pages.

PCT/CN2019/098037 International Search Report dated Apr. 14, 2020, 2 pages.

* cited by examiner

METHOD FOR DETERMINING CONTENTION WINDOW, AND COMMUNICATION DEVICE AND STORAGE MEDIUM

CROSS-REFERENCE TO RELATED APPLICATION

This application is a U.S. national phase of International Application No. PCT/CN2019/098037, filed with the State Intellectual Property Office of P. R. China on Jul. 26, 2019, the content of which is incorporated herein by reference in its entirety.

TECHNICAL FIELD

The disclosure relates to, but is not limited to, a field of communication technologies, and particularly to a method for determining a contention window, a communication device and a storage medium.

BACKGROUND

At present, during development of a wireless communication system, for an unlicensed frequency spectrum, in a $3^{rd}$ generation partnership project (3GPP), a mechanism based on license assisted access (LAA) is proposed to use the unlicensed frequency band, that is, usage of the unlicensed frequency band is implemented with the assistance of a licensed frequency band. In order to ensure coexistence with other systems, such as a wireless fidelity (WiFi) system on the unlicensed frequency band, a mechanism of conducting channel detection before sending data is introduced in mechanism based on LAA.

SUMMARY

The disclosure provides a method and an apparatus for determining a contention window, a communication device, and a storage medium.

According to a first aspect of the embodiments of the disclosure, a method for determining a contention window is provided. The method includes: determining a contention window size (CWS) of a random access contention window on an unlicensed frequency band based on a transmission block (TB) based reception feedback.

According to a second aspect of the embodiments of the disclosure, a method for determining a contention window is provided. The method includes: determining a contention window size (CWS) of a random access contention window on an unlicensed frequency band based on a code block group (CBG) based reception feedback.

According to a third aspect of the embodiments of the disclosure, a method for determining a contention window is provided. The method includes: determining a contention window size (CWS) of a random access contention window on an unlicensed frequency band based on a reception strength of a predefined reference signal.

According to a fourth aspect of the embodiments of the disclosure, a communication device is provided, and includes: an antenna; a memory; and a processor. The processor is connected to the antenna and the memory, respectively, and configured to execute executable programs stored on the memory, control the antenna to receive and send signals, and perform the method for determining a contention window according to any of the forgoing technical solutions.

DETAILED DESCRIPTION

Figure 1:
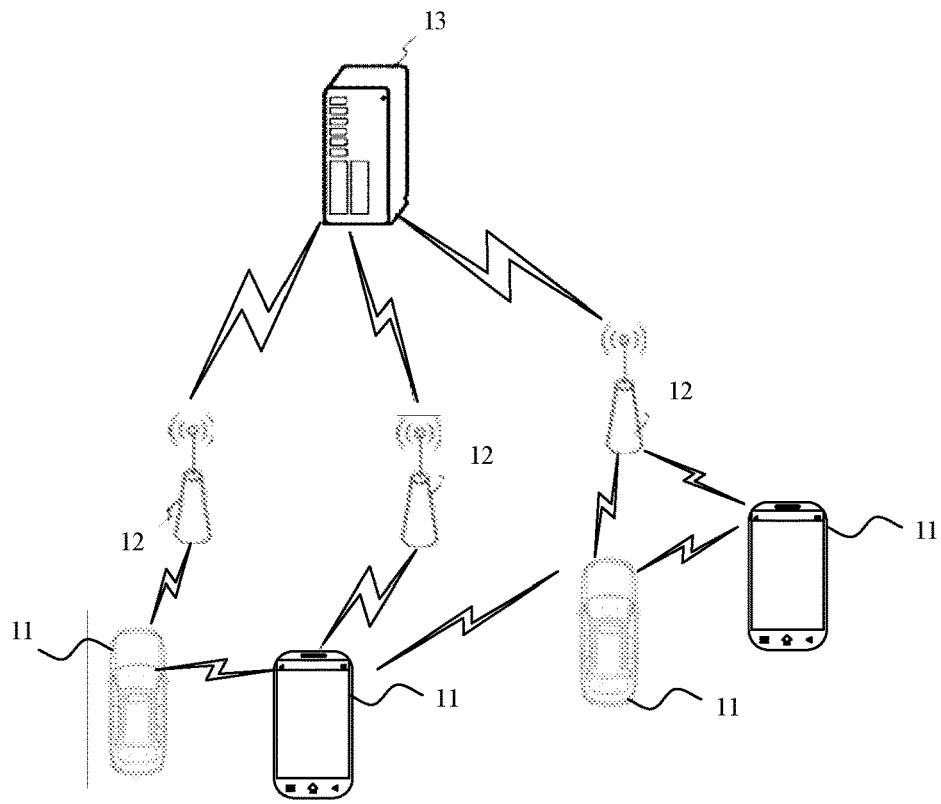
FIG. 1 is a schematic diagram illustrating a wireless communication system according to an embodiment of the present disclosure.

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

Terms used herein in the description of the present disclosure are only for the purpose of describing specific embodiments, but should not be construed to limit the present disclosure. As used in the description of the present disclosure and the appended claims, "a" and "the" in singular forms mean including plural forms, unless clearly indicated in the context otherwise. It should also be understood that, as used herein, the term "and/or" represents and contains any one and all possible combinations of one or more associated listed items.

Although terms such as "first", "second" and "third" are used herein for describing various elements, these elements should not be limited by these terms. These terms are only used for distinguishing one element from another element.

For example, first information may also be called second information, and similarly, the second information may also be called the first information, without departing from the scope of the present disclosure. As used herein, the term "if" may be construed to mean "when" or "upon" or "in response to determining" or "in accordance with a determination" or "in response to detecting," that a stated condition precedent is true, depending on the context.

At present, during development of a wireless communication system, for an unlicensed frequency spectrum, in a $3^{rd}$ generation partnership project (3GPP), a mechanism based on license assisted access (LAA) is proposed to use the unlicensed frequency band, that is, usage of the unlicensed frequency band is implemented with the assistance of a licensed frequency band. In order to ensure coexistence with other systems, such as a wireless fidelity (WiFi) system on the unlicensed frequency band, a mechanism of conducting channel detection before sending data is introduced in mechanism based on LAA. A transmitting end device needs to detect whether a channel is idle when having data to be sent, and only when the channel is idle, the transmitting end device can send data. At present, there are multiple channel detection mechanisms. For example, in a channel detection process for a downlink transmission, a terminal may adopt a channel detection mechanism of category 4 (Cat4).

The channel detection mechanism of cat4 is based on a clear channel assessment (CCA) with random back-off. A wireless communication device equally and randomly generates a back-off counter N between 0 and a contention window size (CWS), and performs listening on granularity of clear channel assessment slot (CCA slot). If it is detected that the channel is idle within a listening time slot, the back-off counter is decreased by 1. If it is detected that the channel is busy, the back-off counter is suspended, i.e., the back-off counter keeps unchanged during a busy time of the channel, until it is detected that the channel is idle. When the back-off counter indicates 0, the wireless communication device may occupy the channel immediately. Here, the CWS is adjusted dynamically in the channel detection mechanism of cat4. The wireless communication device dynamically adjusts the CWS based on whether a previous transmission is correctly received by a receiving node. However, in the related art, it is possible that the CWS is set inappropriately, which may cause a conflict in using the unlicensed frequency band and a low access efficiency of the random access.

FIG. 1 is a schematic diagram illustrating a wireless communication system according to an embodiment of the present disclosure. As illustrated in FIG. 1, the wireless communication system is a communication system based on a cellular mobile communication technology. The wireless communication system may include several terminals 11 and several base stations 12.

The terminal 11 may refer to a device that provides voice and/or data connectivity for a user. The terminal 11 may communicate with one or more core networks through a radio access network (RAN). The terminal 11 may be an internet of things terminal, for example, a sensor device, a mobile phone (or referred to as a cellular phone) and a computer having an internet of things terminal, for example, may be a fixed, portable, compact, handheld, computer built-in or vehicle-mounted apparatus, for example, a station (STA), a subscriber unit, a subscriber station, a mobile station, a mobile, a remote station, an access point, a remote terminal, an access terminal, a user terminal, a user agent, a user device or a user equipment (UE). Or, the terminal 11 may be a device of an unmanned vehicle, a vehicle-mounted device, etc. for example, a vehicle-mounted computer has the wireless communication function, or a wireless communication device externally connected to the vehicle-mounted computer. Or, the terminal 11 may be a roadside device, for example a road light, a traffic light or other roadside devices each has the wireless communication function.

The base station 12 may be a network side device in the wireless communication system. The wireless communication system may be the 4th generation mobile communication (4G) system, also referred to as a long term evolution (LTE) system; or the wireless communication system may be the 5G system, also referred to as a new radio (NR) system. Or, the wireless communication system may be a next generation system of the 5G system. The access network in the 5G system may be called as a new generation-radio access network (NG-RAN). Or the wireless communication system may be a MTC system.

The base station 12 may be an eNB adopted in the 4G system. Or, the base station 12 may be a base station (gNB) with a centralized distributed architecture in the 5G system. When the base station 12 adopts a centralized distributed architecture, it generally includes a central unit (CU) and at least two distributed units (DU). The central unit is provided with a protocol stack including a Packet Data Convergence Protocol (PDCP) layer, a Radio Link Control (RLC) layer and a Media Access Control (MAC) layer. The distributed unit is provided with a protocol stack including a physical (PHY) layer. The specific implementation of the base station 12 is not limited in embodiments of the disclosure.

A wireless connection can be established between the base station 12 and the terminal 11 through a wireless air interface. In different embodiments, the wireless air interface is a wireless air interface based on the 4G standard. Alternatively, the wireless air interface is a wireless air interface based on the 5G standard. For example, the wireless air interface is the NR. Alternatively, the wireless air interface can also be a wireless air interface based on a standard of next generation mobile communication network technology based on the 5G.

In some embodiments, an end to end connection can be established between the terminals 11, for example in a scenario such as a vehicle to vehicle (V2V) communication, a vehicle to infrastructure (V2I) communication and a vehicle to pedestrian (V2P) communication in a vehicle to everything (V2X) communication.

In some embodiments, the wireless communication system may further include a network management device 13.

Server base stations 12 are connected to the network management device 13 respectively. The network management device 13 may be a core network device in the wireless communication system. For example, the network management device 13 may be a mobility management entity (MME) of an evolved packet core (EPC) network. Alternatively, the network management device may also be another core network device, such as a serving gateway (SGW), a public data network gateway (PGW), and a policy and charging rules function (PCRF) unit or a home subscriber server (HSS). The implementation form of the network management device 13 is not limited in the embodiments of the disclosure.

Figure 2:
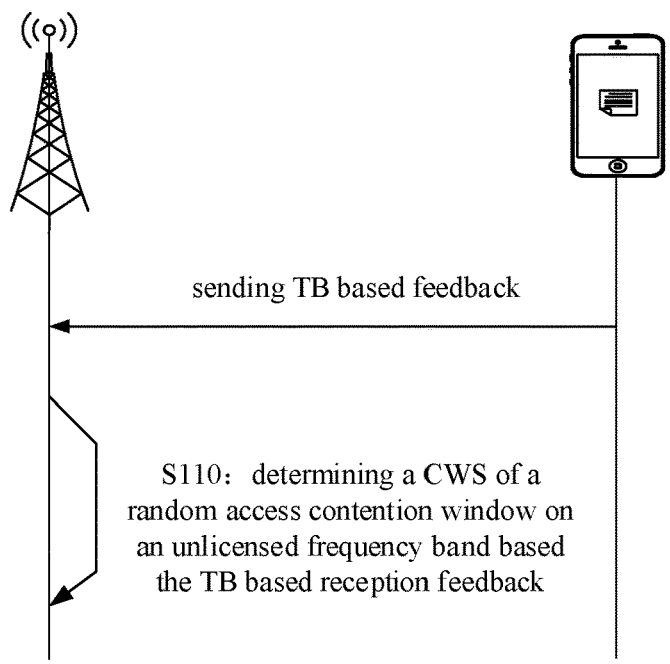
FIG. 2 is a flowchart illustrating a method for determining a contention window according to an embodiment.

FIG. 2 is a flowchart illustrating a method for determining a contention window according to an embodiment of the disclosure. The method includes the following.

At block S110, a contention window size (CWS) of a random access contention window on an unlicensed frequency band is determined based on a transmission block (TB) based reception feedback.

Figure 3:
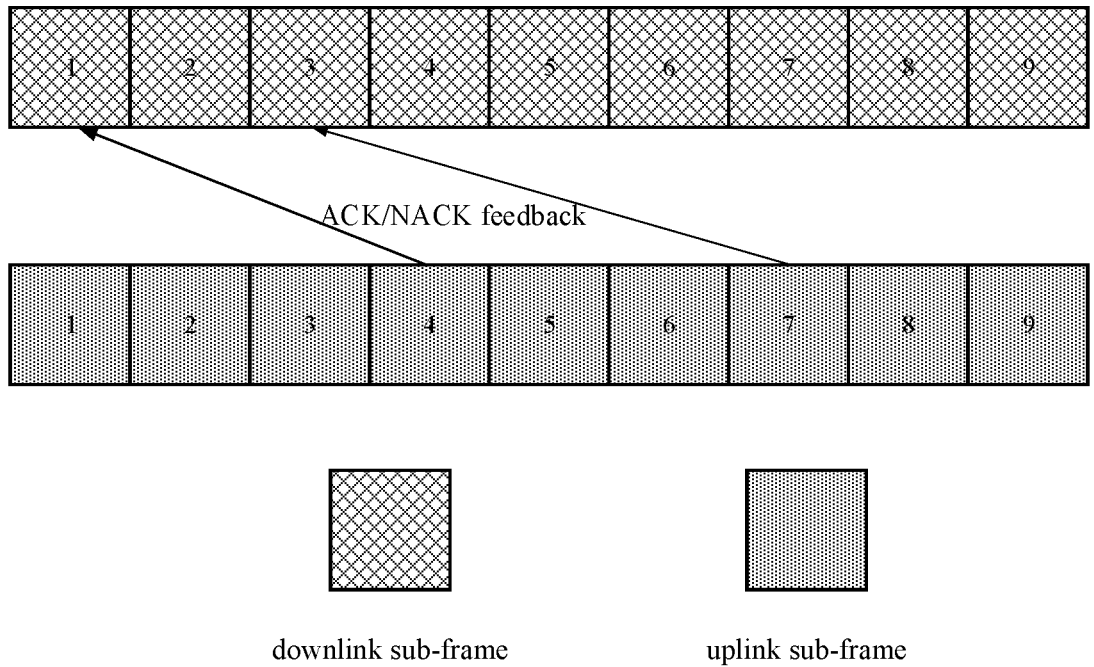
FIG. 3 is a schematic diagram illustrating a delay of an ACK/NACK feedback according to an embodiment.

Here, the TB based reception feedback may be a TB based hybrid automatic repeat request (HARQ) feedback. It should be noted that in the wireless communication system, due to a time-varying characteristic of a wireless channel and an effect of multipath fading, the signal transmission may be affected, thus leading to a failure of data transmission. In order to solve the problem, in the wireless communication system, an HARQ mechanism is introduced. Based on a success or failure of data reception fed back by a receiving device, a transmitting device decides whether to re-transmit a data packet which has been transmitted already. In the LTE system, a time of data transmission has a timing relationship with a feedback time of an ACK/NACK. Due to limit of a processing capability of a terminal, in the LTE system, with reference to FIG. 3, taking a downlink data transmission as an example, the time of the data transmission and the feedback time of the ACK/NACK have a difference of 4 ms. It should be noted that, in a design of the 5G NR system, a CBG based feedback mechanism is introduced. That is, a transmission of one TB may include multiple CBGs. The receiving device may perform HARQ feedback for each CBG, without performing feedback for the whole TB. Here, using the TB based feedback mode may reduce overhead of signaling and control channel resources but may waste a resource for retransmission. Using the CBG based feedback mode may reduce occurrence of retransmitting the whole TB so as to reduce a waste of transmission resources due to retransmission, but may cause an increase of control signaling. Here, the feedback mode may be adjusted based on actual situations, such that the overhead of control signaling may be controlled while improving performance of the data transmission.

Here, a data sending device of the TB based reception feedback may be a user equipment (UE), and a corresponding data receiving device may be a base station. It should be noted that, when the data sending device of the feedback is the UE, the corresponding data receiving device may be also a UE, for example in a everything to everything sidelink communication or the V2X communication. Here, the CWS may be a time length corresponding to the contention window. For example, taking a time slot as the time unit, a minimum CWS may be set to 15 time slots.

In the embodiment of the disclosure, the CWS of the random access contention window on the unlicensed frequency band can be determined based on the TB based reception feedback. Since the CWS adapts to the TB based reception feedback, the CWS more suitable to a current transmission scenario may be obtained.

Figure 4:
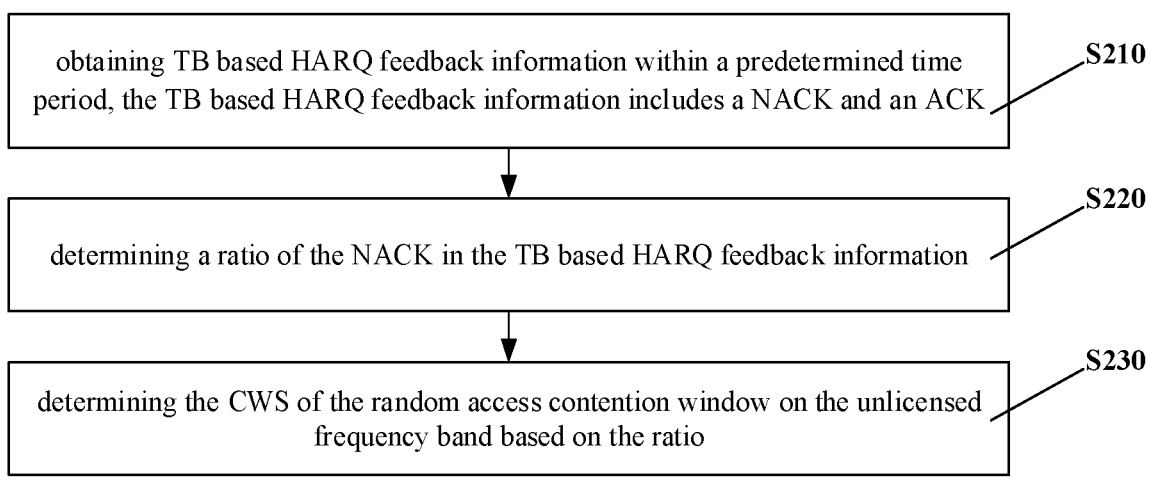
FIG. 4 is a flowchart illustrating a method for determining a contention window according to another embodiment.

In one embodiment, as illustrated in FIG. 4, a method of determining a contention window is provided. The step of determining the CWS of the random access contention window on the unlicensed frequency band based on the TB based reception feedback in block S110 may include the following.

At block S210, TB based HARQ feedback information within a predetermined time period is obtained. The TB based HARQ feedback information includes a NACK and an ACK.

At block S220, a ratio of the NACK in the TB based HARQ feedback information is determined.

At block S230, the CWS of the random access contention window on the unlicensed frequency band is determined based on the ratio.

Here, the predetermined time period may be a time period corresponding to a time slot, a symbol, a sub-frame, a wireless frame or other customized time period.

Here, when transmitting data based on the TB based HARQ feedback, the data receiving device determines whether the data is received correctly. When the data is received correctly, the ACK is fed back. When the data is not received correctly, the NACK is fed back. Here, the ACK/ACK is transmitted on a physical uplink control channel (PUCCH) or a physical uplink shared channel (PUSCH).

Here, in an embodiment, there are two TB based Physical Downlink Shared Channel (PDSCH) transmissions having HARQ feedback to be performed in in one time slot, one of them feeds back the NACK, then the ratio of the NACK in the HARQ feedback information is ½=0.5.

Figure 5:
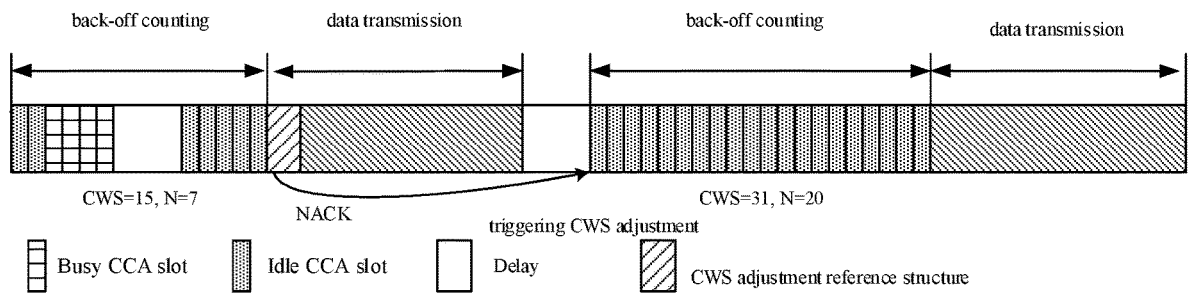
FIG. 5 is a schematic diagram illustrating a channel detection mechanism of cat4 which performs detection based on a clear channel assessment with random back-off according to an embodiment.

Here, determining the CWS of the random access contention window on the unlicensed frequency band based on the ratio may include: when the ratio of the NACK in the HARQ feedback information is greater than a preset threshold, increasing the CWS; when the ratio of the NACK in the HARQ feedback information is not greater than a preset threshold, setting the CWS to be a preset minimum value. In addition, when the number of occurrences of maintaining the CWS to be a preset maximum value reaches a preset number, the CWS is set to the preset minimum value. With reference to FIG. 5, take a channel detection mechanism of cat4 which performs detection based on a clear channel assessment with random back-off as an example. A back-off counter N is generated randomly and equally by a wireless communication device between 0 and CWS, and listening is performed on granularity of CCA slot. If it is detected that the channel is idle in the CCA slot (i.e., Idle CCA slot), the back-off counter is decreased by 1. If it is detected that the channel is busy in the CCA slot (i.e., Busy CCA slot), the back-off counter is suspended, that is, the back-off counter keeps unchanged during the Busy CCA slot, until it is detected the channel is idle. When the back-off counter indicates 0, the wireless communication device may immediately occupy the channel. In the channel detection mechanism of cat4, the CWS may be adjusted dynamically. The wireless communication device dynamically adjusts the CWS based on whether a previous transmission is correctly received by a receiving node. In this way, a suitable CWS may be obtained based on a channel state and a network business load, thus achieving a compromise between decreasing a collision of nodes and improving a channel access efficiency. Assuming that the CWS corresponding to a first downlink PDSCH transmission is 15, if the terminal cannot receive the PDSCH successfully in the first downlink PDSCH transmission, the base station may determine that the ratio of the NACK in the HARQ feedback information is greater than the preset threshold 80% based on the failure of reception using any technical solution in the disclosure. In this case, the CWS needs to be increased, such that the CWS may be adjusted to 31. And the CWS which is equal to 31 will be used in a second downlink PDSCH transmission to generate a random N and perform the channel listening.

Here, determining the CWS of the random access contention window on the unlicensed frequency band may include the following.

In a first step, for each business priority $p \in \{1,2,3,4\}$, the CWS is set. Assuming that the CWS is represented by $CW_p$, then $CW_p = CW_{min,p}$.

In a second step, when the ratio of the NACK in the HARQ feedback information is greater than 0.8, the value of $CW_p$ is increased for each business priority $p \in \{1,2,3,4\}$. Here, the value $CW_p$ in a higher level is obtained from a CWS table (the CWS table includes values of $CW_p$ in different levels) corresponding to the business priority, and maintained in the second step. When ratio of the NACK in the HARQ feedback information is not greater than 0.8, the first step is executed, to decrease the value of $CW_p$ for each business priority $p\in\{1,2,3,4\}$ to the value of $CW_p$ in a lowest level in the CWS table corresponding to the business priority. A reference sub-frame k may be a first sub-frame in a downlink transmission closest to a current time sent by the base station on a current carrier, and the base station may expect to receive a HARQ-ACK feedback on the sub-frame. In addition, if the value of $CW_p$ equals to the maximum value $CW_{max,p}$ in the set, a next higher value of the CWS is still $CW_{max,p}$. If the value of $CW_p$ corresponding to a certain business priority is adjusted continually for Q times, and in the back-off counter, the CWS equals to the maximum value, i.e., $CW_p=CW_{max,p}$, then the value of $CW_p$ corresponding to the certain business priority is set to the minimum value $CW_{min,p}$. The value of Q is selected by the base station from $\{1, 2, \ldots, 8\}$. And the value of Q can be selected independently for each business priority $p\in\{1,2,3,4\}$.

Figure 6:
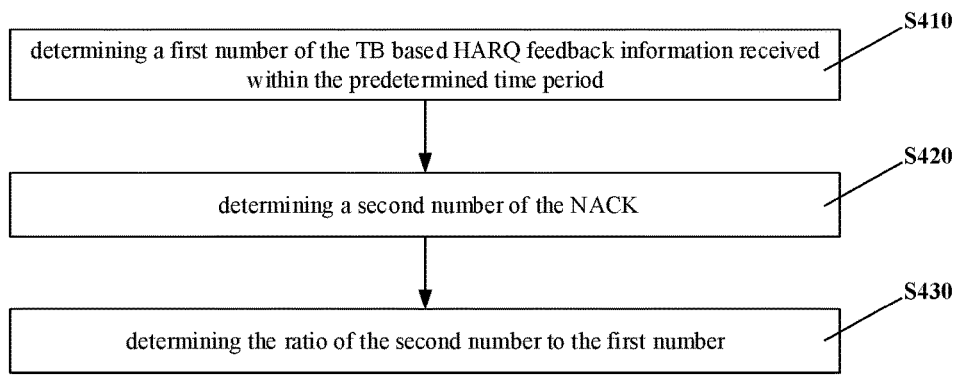
FIG. 6 is a flowchart illustrating a method for determining a contention window according to a still embodiment.

In an embodiment, as illustrated in FIG. 6, a method of determining a contention window is provided. The step of determining the ratio of the NACK in the TB based HARQ feedback information in block S220 may include the following.

At block S410, a first number of the TB based HARQ feedback information received within the predetermined time period is determined.

At block S420, a second number of the NACK is determined.

At block S430, the ratio of the second number to the first number is determined.

Here, assuming that there are two TB based PDSCH transmissions having HARQ feedback to be performed in a reference time slot and one of them feeds back the NACK. Further, assuming that there are ten CBGs having HARQ feedback to be performed and seven of them feed back the NACK. A coefficient is set to 0.5. Then the second number of the NACK is 1*0.5+7*0.5=4. The first number of the HARQ feedback information is 2*0.5+10*0.5=6. The ratio of the second number to the first number is 66.7%.

In an embodiment, in block S220, the ratio includes a first ratio obtained based on the TB based reception feedback.

In block S230, determining the CWS of the random access contention window on the unlicensed frequency band based on the ratio includes: determining the CWS of the random access contention window on the unlicensed frequency band based on the first ratio.

Here, in an embodiment, a coefficient is defined, which is used to represent a proportion of the TB based HARQ feedback and the CBG based HARQ feedback in a statistical result. The first ratio of the fed back NACK in the time slot is determined based on the coefficient. For example, assume that there are two TB based PDSCH transmissions having HARQ feedback to be performed in a reference time slot and one of them feeds back the NACK. Further, assume that there are ten CBGs having HARQ feedback to be performed and seven of them feed back the NACK. If the predefined coefficient is 0.5, then the first ratio of the fed back NACK is (1*0.5+7*0.5)/(2*0.5+10*0.5)=66.7%. The CWS of the random access contention window on the unlicensed frequency band can be determined based on the first ratio.

In another embodiment, another coefficient can be defined, which is used to represent a number of CBGs forming one TB for statistics. The coefficient can be pre-defined. For example, assume that there are two TB based PDSCH transmissions having HARQ feedback to be performed in a reference time slot and one of them feeds back the NACK. Further, assume that there are ten CBGs having HARQ feedback to be performed and seven of them feed back the NACK. If the predefined coefficient is 4, then the first ratio of the fed back NACK is (1+7/4)/(2+10/4)=61.1%. The CWS of the random access contention window on the unlicensed frequency band can be determined based on the first ratio.

Further, a specific embodiment is provided in the disclosure, to further explain the method for determining a contention window provided in the disclosure. The predetermined time period in the specific embodiment is a time slot. The TB based or CBG based HARQ feedback is performed on the time slot.

In example 1, the method of determining the CWS based on the TB based HARQ feedback mode is explained below.

For the TB based HARQ feedback, the second number of the fed back NACK is calculated directly.

For the CBG based HARQ feedback, in one embodiment, a value is defined, which is used to represent a proportion of the TB based HARQ feedback and the CBG based HARQ feedback in a statistical result. The first ratio of the fed back NACK in the time slot is determined based on the value. For example, assume that there are two TB based PDSCH transmissions having HARQ feedback to be performed in a time slot and one of them feeds back the NACK. Further, assume that there are ten CBGs having HARQ feedback to be performed and seven of them feed back the NACK. If the defined value is 0.5, then the first ratio of the fed back NACK is (1*0.5+7*0.5)/(2*0.5+10*0.5)=66.7%. How to adjust the CWS can be determined based on the first ratio.

In another embodiment, a value is defined, which is used to represent a number of CBGs forming one TB for statistics. The value can be pre-defined. For example, assume that there are two TB based PDSCH transmissions having HARQ feedback to be performed in a time slot and one of them feeds back the NACK. Further, assume that there are ten CBGs having HARQ feedback to be performed and seven of them feed back the NACK. If the defined value is set to 4, then the first ratio of the fed back NACK is (1+7/4)/(2+10/4)=61.1%. How to adjust the CWS can be determined based on the first ratio.

In the example, when it is required to support both the TB based feedback and the CBG based feedback, the CWS of the random access contention window on the unlicensed frequency band may be determined based on the TB based reception feedback. Since the CWS adapts to the TB based reception feedback, the CWS more suitable to a current transmission scenario may be obtained.

Figure 7:
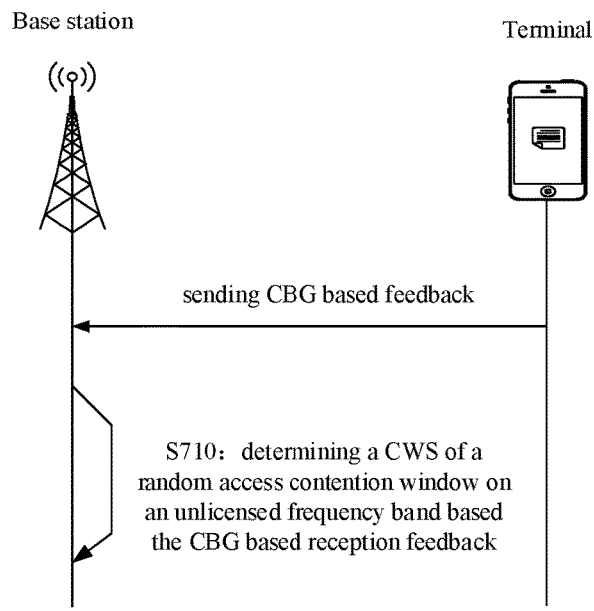
FIG. 7 is a flowchart illustrating a method for determining a contention window according to yet another embodiment.

As illustrated in FIG. 7, a method for determining a contention window is provided in another embodiment. The method includes the following.

At block S710, a contention window size (CWS) of a random access contention window on an unlicensed frequency band is determined based on a code block group (CBG) based reception feedback.

Here, the CBG based reception feedback may be a CBG based hybrid automatic repeat request (HARQ) feedback. It should be noted that in the wireless communication system, due to a time-varying characteristic of a wireless channel and an effect of multipath fading, the signal transmission may be affected, thus leading to a failure of data transmission. In order to solve the problem, in the wireless communication system, an HARQ mechanism is introduced. Based on a success or failure of data reception fed back by a receiving device, a transmitting device decides whether to re-transmit a data packet which has been transmitted already. In the LTE system, a time of data transmission has a timing relationship with a feedback time of an ACK/NACK. Due to limit of a processing capability of a terminal, in the LTE system, with reference to FIG. 3 again, taking a downlink data transmission as an example, the time of the data transmission and the feedback time of the ACK/NACK have a difference of 4 ms. It should be noted that, in a design of the 5G NR system, a CBG based feedback mechanism is introduced. That is, a transmission of one TB may include multiple CBGs. The receiving device may perform HARQ feedback for each CBG, without performing feedback for the whole TB. Here, using the CBG based feedback mode may reduce occurrence of retransmitting the whole TB so as to reduce a waste of transmission resources due to retransmission, but may cause an increase of control signaling. Using the TB based feedback mode may reduce overhead of signaling and control channel resources but may waste a resource for retransmission. Here, the feedback mode may be adjusted based on actual situations, such that the overhead of control signaling may be controlled while improving performance of the data transmission.

Here, a data sending device of the CBG based reception feedback may be a user equipment (UE), and a corresponding data receiving device may be a base station. It should be noted that, when the data sending device of the feedback is the UE, the corresponding data receiving device may be also a UE, for example in a everything to everything sidelink communication or the V2X communication. Here, the CWS may be a time length corresponding to the contention window. For example, taking a time slot as the time unit, a minimum CWS may be set to 15 time slots.

In the embodiment of the disclosure, the CWS of the random access contention window on the unlicensed frequency band can be determined based on the CBG based reception feedback. Since the CWS adapts to the CBG based reception feedback, the CWS more suitable to a current transmission scenario may be obtained.

Figure 8:
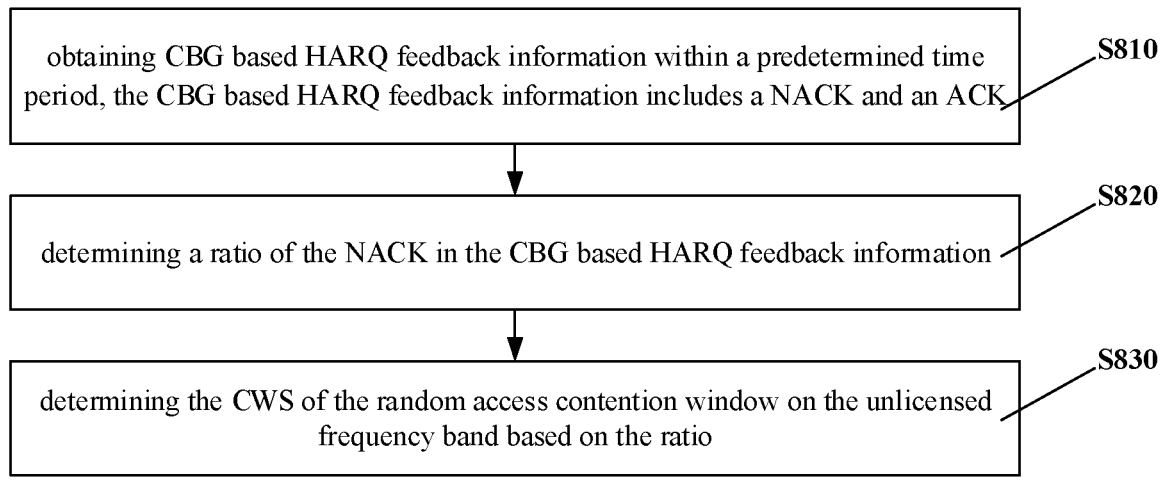
FIG. 8 is a flowchart illustrating a method for determining a contention window according to yet still embodiment.

In one embodiment, as illustrated in FIG. 8, a method of determining a contention window is provided. The step of determining the CWS of the random access contention window on the unlicensed frequency band based on the CBG based reception feedback in block S710 may include the following.

At block S810, CBG based HARQ feedback information within a predetermined time period is obtained. The CBG based HARQ feedback information includes a NACK and an ACK.

At block S820, a ratio of the NACK in the CBG based HARQ feedback information is determined.

At block S830, the CWS of the random access contention window on the unlicensed frequency band is determined based on the ratio.

Here, the predetermined time period may be a time period corresponding to a time slot, a symbol, a sub-frame, a wireless frame or other customized time period.

Here, when transmitting data based on the CBG based HARQ feedback, the data receiving device determines whether the data is received correctly. When the data is received correctly, the ACK is fed back. When the data is not received correctly, the NACK is fed back. Here, the ACK/ACK is transmitted on a physical uplink control channel (PUCCH) or a physical uplink shared channel (PUSCH).

Assuming that there are ten CBGs having HARQ feedback to be performed and seven of them feed back the NACK, then the ratio of the NACK in the HARQ feedback information is 7/10=0.7.

Here, determining the CWS of the random access contention window on the unlicensed frequency band based on the ratio may include: when the ratio of the NACK in the HARQ feedback information is greater than a preset threshold, increasing the CWS; when the ratio of the NACK in the HARQ feedback information is not greater than a preset threshold, setting the CWS to be a preset minimum value. In addition, when the number of occurrences of maintaining the CWS to be a preset maximum value reaches a preset number, the CWS is set to the preset minimum value. With reference to FIG. 5 again, take a channel detection mechanism of cat4 which performs detection based on a clear channel assessment with random back-off as an example. A back-off counter N is generated randomly and equally by a wireless communication device between 0 and CWS, and listening is performed on granularity of CCA slot. If it is detected that the channel is idle in the CCA slot (i.e., Idle CCA slot), the back-off counter is decreased by 1. If it is detected that the channel is busy in the CCA slot (i.e., Busy CCA slot), the back-off counter is suspended, that is, the back-off counter keeps unchanged during the Busy CCA slot, until it is detected the channel is idle. When the back-off counter indicates 0, the wireless communication device may immediately occupy the channel. In the channel detection mechanism of cat4, the CWS may be adjusted dynamically. The wireless communication device dynamically adjusts the CWS based on whether a previous transmission is correctly received by a receiving node. In this way, a suitable CWS may be obtained based on a channel state and a network business load, thus achieving a compromise between decreasing a collision of nodes and improving a channel access efficiency. Assuming that the CWS corresponding to a first downlink PDSCH transmission is 15, if the terminal cannot receive the PDSCH successfully in the first downlink PDSCH transmission, the base station may determine that the ratio of the NACK in the HARQ feedback information is greater than the preset threshold 80% based on the failure of reception using any technical solution in the disclosure. In this case, the CWS needs to be increased, such that the CWS may be adjusted to 31. And the CWS which is equal to 31 will be used in a second downlink PDSCH transmission to generate a random N and perform the channel listening.

Here, determining the CWS of the random access contention window on the unlicensed frequency band may include the following.

In a first step, for each business priority $p \in \{1,2,3,4\}$ the CWS is set. Assuming that the CWS is represented by $CW_p$, then $CW_p = CW_{min,p}$.

In a second step, when the ratio of the NACK in the HARQ feedback information is greater than 0.8, the value of $CW_p$ is increased for each business priority $p \in \{1,2,3,4\}$. Here, the value $CW_p$ in a higher level is obtained from a CWS table (the CWS table includes values of $CW_p$ in different levels) corresponding to the business priority, and maintained in the second step. When ratio of the NACK in the HARQ feedback information is not greater than 0.8, the first step is executed, to decrease the value of $CW_p$ for each business priority $p \in \{1,2,3,4\}$ to the value of $CW_p$ in a lowest level in the CWS table corresponding to the business priority. A reference sub-frame k may be a first sub-frame in a downlink transmission closest to a current time sent by the base station on a current carrier, and the base station may expect to receive a HARQ-ACK feedback on the sub-frame. In addition, if the value of $CW_p$ equals to the maximum value $CW_{max,p}$ in the set, a next higher value of the CWS is still $CW_{max,p}$. If the value of $CW_p$ corresponding to a certain business priority is adjusted continually for Q times, and in the back-off counter, the CWS equals to the maximum value, i.e., $CW_p = CW_{max,p}$, then the value of $CW_p$ corresponding to the certain business priority is set to the minimum value $CW_{min,p}$. The value of Q is selected by the base station from {1, 2, . . . , 8}. And the value of Q can be selected independently for each business priority p∈{1,2,3,4}.

Figure 9:
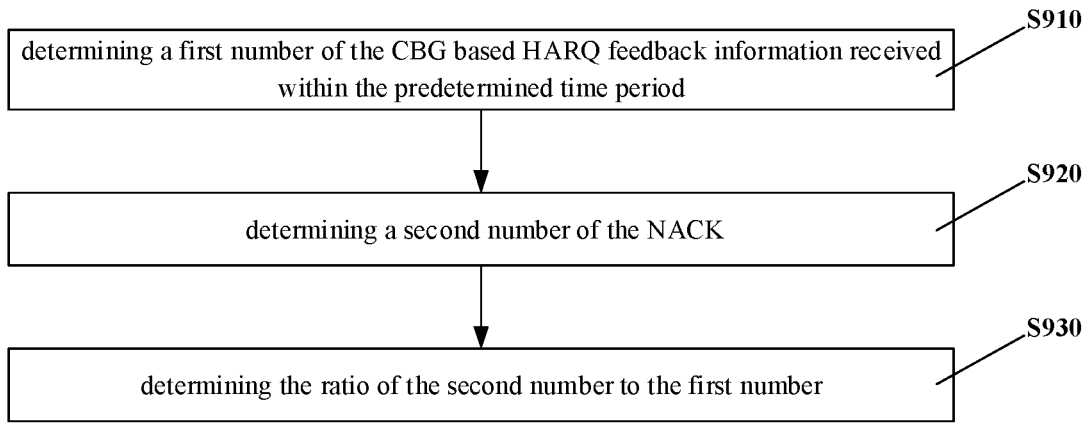
FIG. 9 is a flowchart illustrating a method for determining a contention window according to still another embodiment.

In an embodiment, as illustrated in FIG. 9, a method of determining a contention window is provided. The step of determining the ratio of the NACK in the CBG based HARQ feedback information in block S820 may include the following.

At block S910, a first number of the CBG based HARQ feedback information received within the predetermined time period is determined.

At block S920, a second number of the NACK is determined.

At block S930, the ratio of the second number to the first number is determined.

Here, assume that there are two TB based PDSCH transmissions having HARQ feedback to be performed in a reference time slot and one of them feeds back the NACK. Further, assume that there are ten CBGs having HARQ feedback to be performed and seven of them feed back the NACK. A coefficient is set to 0.5. Then the second number of the fed back NACK is 1*0.5+7*0.5=4. The first number of the HARQ feedback information is 2*0.5+10*0.5=6. The ratio of the second number to the first number is 66.7%.

In an embodiment, in block S820, the ratio includes a second ratio obtained based on the CBG based reception feedback.

In block S830, determining the CWS of the random access contention window on the unlicensed frequency band based on the ratio includes: determining the CWS of the random access contention window on the unlicensed frequency band based on the second ratio.

Here, in an embodiment, a coefficient is defined, which is used to represent a proportion of the TB based HARQ feedback and the CBG based HARQ feedback in a statistical result. The second ratio of the fed back NACK in the reference time slot is determined based on the coefficient. For example, assume that there are two TB based PDSCH transmissions having HARQ feedback to be performed in a reference time slot and one of them feeds back the NACK. Further, assume that there are ten CBGs having HARQ feedback to be performed and seven of them feed back the NACK. If the predefined coefficient is 0.5, then the second ratio of the fed back NACK is (1*0.5+7*0.5)/(2*0.5+10*0.5)=66.7%. The CWS of the random access contention window on the unlicensed frequency band can be determined based on the second ratio.

In another embodiment, another coefficient can be defined, which is used to represent a number of CBGs forming one TB for statistics. The coefficient can be predefined. For example, assume that there are two TB based PDSCH transmissions having HARQ feedback to be performed in a reference time slot and one of them feeds back the NACK. Further, assume that there are ten CBGs having HARQ feedback to be performed and seven of them feed back the NACK. If the predefined coefficient is 4, then the second ratio of the fed back NACK is (1+7/4)/(2+10/4)=61.1%. The CWS of the random access contention window on the unlicensed frequency band can be determined based on the second ratio.

Further, a specific embodiment is provided in the disclosure, to further explain the method for determining a contention window provided in the disclosure. The predetermined time period in the specific embodiment is a time slot. The TB based or CBG based HARQ feedback is performed on the time slot.

In example 2, the method of determining the CWS based on the CBG based HARQ feedback mode is explained below.

Similar to example 1, for the CBG based HARQ feedback, the second number of the fed back NACK is calculated directly.

For the TB based HARQ feedback, in one embodiment, a value is defined, which is used to represent a proportion of the TB based HARQ feedback and the CBG based HARQ feedback in a statistical result. The second ratio of the fed back NACK in the time slot is determined based on the value. For example, assume that there are two TB based PDSCH transmissions having HARQ feedback to be performed in a time slot and one of them feeds back the NACK. Further, assume that there are ten CBGs having HARQ feedback to be performed and seven of them feed back the NACK. If the defined value is 0.5, then the second ratio of the fed back NACK is (1*0.5+7*0.5)/(2*0.5+10*0.5)=66.7%. How to adjust the CWS can be determined based on the second ratio.

In another embodiment, a value is defined, which is used to represent a number of CBGs forming one TB for statistics. The value can be pre-defined. For example, assume that there are two TB based PDSCH transmissions having HARQ feedback to be performed in a time slot and one of them feeds back the NACK. Further, assume that there are ten CBGs having HARQ feedback to be performed and seven of them feed back the NACK. If the defined value is set to 4, then the ratio of the fed back NACK is (1+7/4)/(2+10/4)=61.1%. How to adjust the CWS can be determined based on the ratio.

In the example, when it is required to support both the TB based feedback and the CBG based feedback, the CWS of the random access contention window on the unlicensed frequency band may be determined based on the CBG based reception feedback. Since the CWS adapts to the CBG based reception feedback, the CWS more suitable to a current transmission scenario may be obtained.

Figure 10:
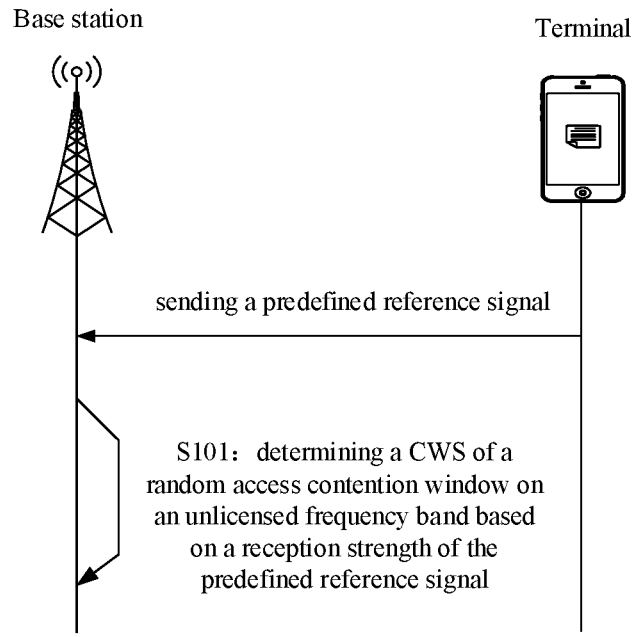
FIG. 10 is a flowchart illustrating a method for determining a contention window according to still another embodiment.

As illustrated in FIG. 10, a method for determining a contention window is provided in another embodiment. The method includes determining a contention window size (CWS) of a random access contention window on an unlicensed frequency band based on a reception strength of a predefined reference signal.

Here, the reception strength may include a reception power of the predefined reference signal. The predefined reference signal includes: a first type of signal and a second type of signal. The first type of signal has a predetermined function and a function of determining the CWS of the random access contention window, and the second type of signal has the function of determining the CWS of the random access contention window.

In an embodiment, assuming that the CWS corresponding to a first downlink PDSCH transmission is 15, if the reception strength of the predefined reference signal is lower than a predetermined strength in the first downlink transmission, the base station adjusts the CWS to 30 based on the comparison. And the CWS which is equal to 30 will be used in a second downlink PDSCH transmission to generate a random N and perform the channel listening.

Further, a specific embodiment is provided in the disclosure, to further explain the method for determining a contention window provided in the disclosure. The predetermined time period in the specific embodiment is a time slot. The TB based or CBG based HARQ feedback is performed on the time slot.

In example 3, the method of determining the CWS based on a measurement of the reception strength of the predefined reference signal is explained below.

In the example, a predetermined strength is defined. The reception strength of the predefined reference signal in the time slot is measured and compared with the predetermined strength, so as to determine how to adjust the CWS. Here, the predefined reference signal may be the first type of signal, i.e., an existing signal, or may be the second type of signal, i.e., a newly defined signal.

In the example, when requiring supporting both the TB based feedback and the CBG based feedback, the CWS of the random access contention window on the unlicensed frequency band may be determined based on the reception strength of the predefined reference signal. Since the CWS adapts to the reception strength of the predefined reference signal, the CWS more suitable to a current transmission scenario may be obtained.

Figure 11:
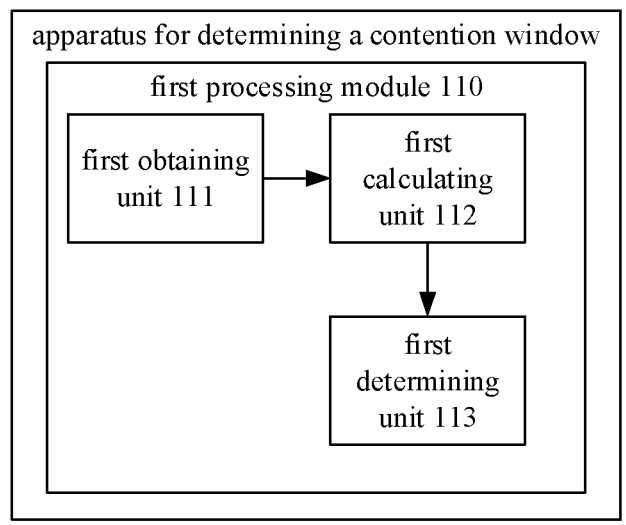
FIG. 11 is a block diagram illustrating an apparatus for determining a contention window according to an embodiment.

FIG. 11 is a block diagram illustrating an apparatus for determining a contention window according to an embodiment. The apparatus includes a first processing module 110. The processing module 110 is configured to determine a contention window size (CWS) of a random access contention window on an unlicensed frequency band based on a transmission block (TB) based reception feedback.

In an embodiment, the first processing module 110 includes a first obtaining unit 111, a first calculating unit 112 and a first determining unit 113.

The first obtaining unit 111 is configured to obtain a TB based hybrid automatic repeat request (HARQ) feedback information within a predetermined time period, in which the TB based HARQ feedback information includes a non-acknowledge identifier (NACK) and an acknowledge identifier (ACK).

The first calculating unit 112 is configured to determine a ratio of the NACK in the TB based HARQ feedback information.

The first determining unit 113 is configured to determine the CWS of the random access contention window on the unlicensed frequency band based on the ratio.

In an embodiment, the first calculating unit 112 is further configured to: determine a first number of the TB based HARQ feedback information received within the predetermined time period; determine a second number of the NACK; and determine the ratio of the second number to the first number.

In an embodiment, the first calculating unit 112 is further configured to obtain a first ratio based on the TB based reception feedback. Determining the CWS of the random access contention window on the unlicensed frequency band based on the ratio includes: determining the CWS of the random access contention window on the unlicensed frequency band based on the first ratio.

Figure 12:
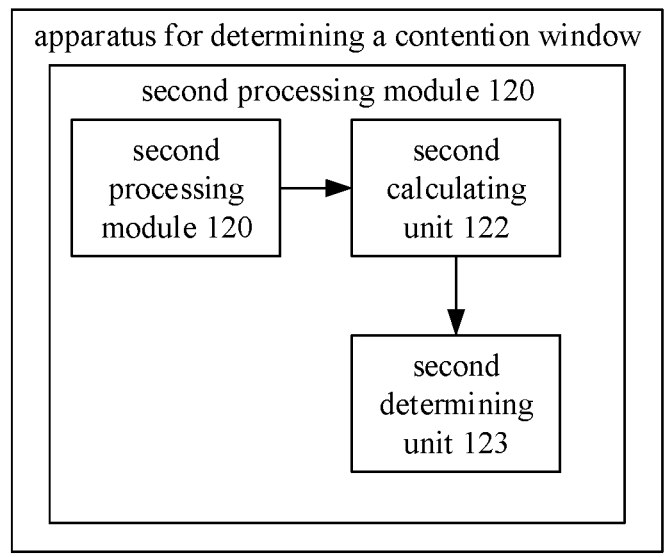
FIG. 12 is a block diagram illustrating an apparatus for determining a contention window according to another embodiment.

As illustrated in FIG. 12, an apparatus for determining a contention window is provided in an embodiment of the disclosure. The apparatus includes a second processing module 120. The second processing module 120 is configured to determine a contention window size (CWS) of a random access contention window on an unlicensed frequency band based on a code block group (CBG) based reception feedback.

In an embodiment, the second processing module 120 includes a second obtaining unit 121, a second calculating unit 122 and a second determining unit 123.

The second obtaining unit 121 is configured to obtain a CBG based hybrid automatic repeat request (HARQ) feedback information within a predetermined time period, in which the CBG based HARQ feedback information includes a non-acknowledge identifier (NACK) and an acknowledge identifier (ACK).

The second calculating unit 122 is configured to determine a ratio of the NACK identifier in the CBG based HARQ feedback information.

The second determining unit 123 is configured to determine the CWS of the random access contention window on the unlicensed frequency band based on the ratio.

In an embodiment, the second calculating unit 122 is further configured to: determine a first number of the CBG based HARQ feedback information received within the predetermined time period; determine a second number of the NACK; and determine the ratio of the second number to the first number.

In an embodiment, the second calculating unit 122 is further configured to obtain a second ratio based on the CBG based reception feedback. Determining the CWS of the random access contention window on the unlicensed frequency band based on the ratio comprises: determining the CWS of the random access contention window on the unlicensed frequency band based on the second ratio.

Figure 13:
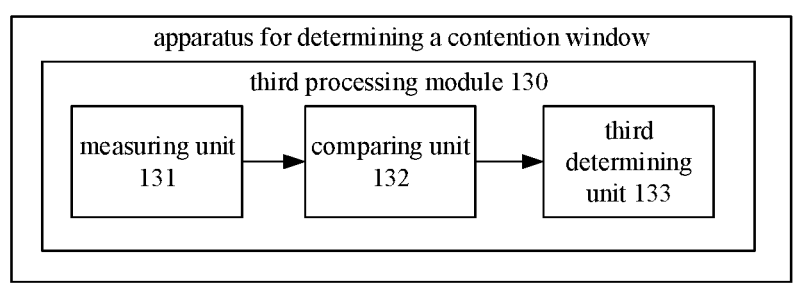
FIG. 13 is a block diagram illustrating an apparatus for determining a contention window according to a still embodiment.

As illustrated in FIG. 13, an apparatus for determining a contention window is provided in an embodiment of the disclosure. The apparatus includes a third processing module 130. The third processing module 130 is configured to determine a contention window size (CWS) of a random access contention window on an unlicensed frequency band based on a reception strength of a predefined reference signal.

In an embodiment, the third processing module 130 includes a measuring unit 131, a comparing unit 132 and a third determining unit 133.

The measuring unit 131 is configured to measure the reception strength of the predefined reference signal within a predetermined time period.

The comparing unit 132 is configured to compare the reception strength with a predetermined strength to obtain a comparison result.

The third determining unit 133 is configured to determine the CWS of the random access contention window on the unlicensed frequency band based on the comparison result.

In an embodiment, the third processing module 133 is configured to configure the predefined reference signal to include a first type of signal and a second type of signal. The first type of signal has a predetermined function and a function of determining the CWS of the random access contention window, and the second type of signal has the function of determining the CWS of the random access contention window.

The embodiment of the disclosure further provides a communication device. The communication device includes an antenna; a memory; and a processor. The processor is connected to the antenna and the memory, respectively, and configured to execute executable programs stored on the memory, control the antenna to receive and send signals, and perform the method for determining a contention window according to any of the forgoing embodiments.

The communication device provided in the embodiment may be the above-mentioned terminal or base station. The terminal may be any of various people-carried terminals or vehicle-mounted terminals. The base station may be any of various types of base stations, for example the 4G base station, the 5G base station and so on.

The antenna may be selected from various types of antennas, for example, a mobile antenna such as the 3G antenna, the 4G antenna, the 5G antenna and so on. The antenna may further includes a WiFi antenna, a wirelessly powered antenna and so on.

The memory may include various of types of storage mediums. The storage medium may be a non-transitory computer storage medium, and is capable of keeping information stored thereon after the communication device is powered off.

The processor may be connected to the antenna and the memory through a bus, and configured to read the executable programs stored on the memory, for example at least one of the methods illustrated in FIG. 2, FIG. 4, FIG. 6, FIG. 7, FIG. 8, FIG. 9, and FIG. 10.

The embodiment of the disclosure further provides a non-transitory computer-readable storage medium having executable e programs stored thereon. When the executable programs are executed by a processor, steps of the method for determining a contention window according to any of any of the forgoing embodiments are implemented, for example at one of the methods illustrated in FIG. 2, FIG. 4, FIG. 6, FIG. 7, FIG. 8, FIG. 9, and FIG. 10.

Figure 14:
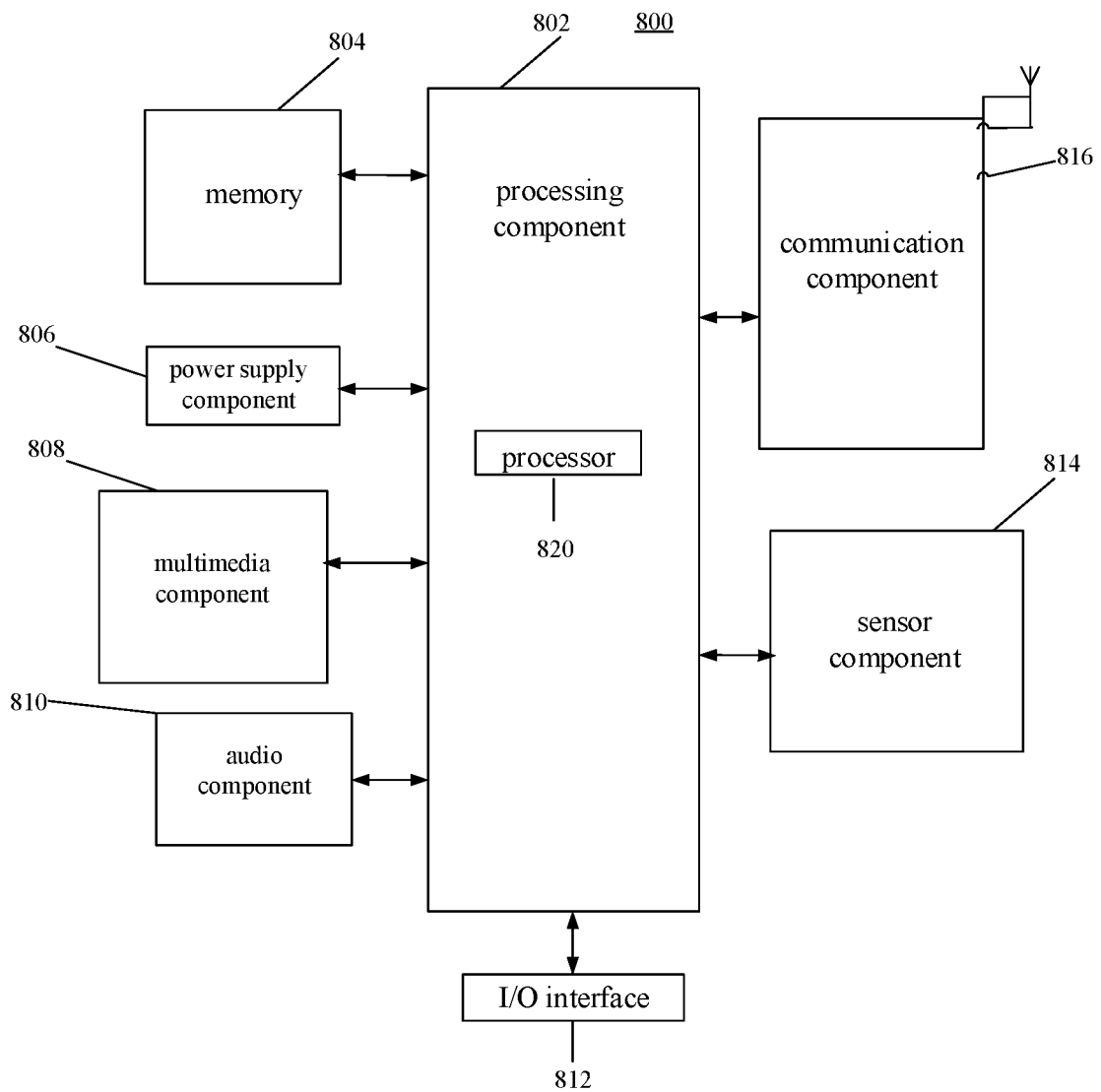
FIG. 14 is a block diagram illustrating a terminal according to an embodiment.

FIG. 14 is a block diagram illustrating a terminal 800 according to an embodiment. For example, the terminal 800 may be a mobile phone, a computer, a digital broadcasting terminal, a messaging device, a game console, a tablet device, a medical equipment, a fitness equipment, a personal digital assistant.

Referring to FIG. 14, the terminal 800 may include one or more components of the followings: a processing component 802, a memory 804, a power supply component 806, a multimedia component 808, an audio component 810, an input/output (I/O) interface 812, a sensor component 814, and a communication component 816.

The processing component 802 generally controls the whole operation of the terminal 800, such as the operations related to display, phone call, data communication, camera operation and recording operation. The processing component 802 may include one or more processors 820 to perform instructions, to complete all or part of blocks of the above method. In addition, the processing component 802 may include one or more modules for the convenience of interaction between the processing component 802 and other components. For example, the processing component 802 may include a multimedia module for the convenience of interaction between the multimedia component 808 and the processing component 802.

The memory 804 is configured to store all types of data to support the operation of the terminal 800. Examples of the data include the instructions of any applications or methods operated on the terminal 800, contact data, phone book data, messages, pictures, videos, etc. The memory 804 may be implemented by any type of temporary or non-temporary storage devices or their combination, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or an optical disk.

The power supply component 806 may provide power for all components of the terminal 800. The power supply component 806 may include a power supply management system, one or more power supplies, and other units related to generating, managing and distributing power for the terminal 800.

The multimedia component 808 includes an output interface screen provided between the apparatus 1100 and the user. In some embodiments, a screen may include a liquid crystal display (LCD) and a touch panel (TP). When the screen includes a TP, the screen may be implemented as a touch screen to receive an input signal from the user. The touch panel includes one or more touch sensors to sense touching, sliding and gestures on the touch panel. The touch sensor may not only sense the boundary of a touch or slide action, but also detect the duration and pressure related to the touch or slide operation. In some embodiments, the multimedia component 808 includes a front camera and/or a rear camera. When the terminal 800 is in an operation mode, such as a shooting mode or a video mode, the front camera or the rear camera may receive the external multimedia data. Each front camera and rear camera may be a fixed optical lens system or an optical lens system with a focal length and an optical zoom capacity.

The audio component 810 is configured to output and/or input an audio signal. For example, the audio component 810 includes a microphone (MIC). When the terminal 800 is in an operation mode, such as a call mode, a record mode, and a speech recognition mode, the microphone is configured to receive the external audio signal. The received audio signal may be further stored in the memory 804 or sent via the communication component 816. In some embodiments, the audio component 810 further includes a speaker configured to output an audio signal.

The I/O interface 812 provides an interface for the processing component 802 and the peripheral interface module, and the peripheral interface module may be a keyboard, a click wheel, a button, etc. The button may include but not limited to a home button, a volume button, a start button and a lock button.

The sensor component 814 includes one or more sensors, configured to provide various aspects of status assessment for the terminal 800. For example, the sensor component 814 may detect the on/off state of the terminal 800 and the relative positioning of the component. For example, the component is a display and a keypad of the terminal 800. The sensor component 814 may further detect the location change of the terminal 800 or one component of the terminal 800, the presence or absence of contact between the user and the terminal 800, the orientation or acceleration/deceleration of the terminal 800, and the temperature change of the terminal 800. The sensor component 814 may include a proximity sensor configured to detect the existence of the objects nearby without any physical contact. The sensor component 814 may further include a light sensor such as CMOS or CCD image sensor, which is configured to use in imaging applications. In some embodiments, the sensor component 814 may further include an acceleration transducer, a gyroscope sensor, a magnetic sensor, a pressure sensor or a temperature sensor.

The communication component 816 is configured for the convenience of wire or wireless communication between the terminal 800 and other devices. The terminal 800 may access wireless networks based on communication standard, such as WiFi, 2G or 3G, or their combination. In an embodiment, the communication component 816 receives broadcast signals or broadcast-related information from an external broadcast management system via a broadcast channel. In an embodiment, the communication component 816 further includes a near field communication (NFC) module to facilitate short-range communication. For example, the NFC module may be achieved based on an RFID technology, an IrDA technology, a UWB technology, a BT technology and other technologies.

In an embodiment, the terminal 800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above methods.

In an embodiment, a non-transitory computer-readable storage medium is further provided which includes instructions, such as the memory 804 including instructions, the instructions may be executed by the processor 820 of the terminal 800 to complete the above methods. For example, the non-transitory computer-readable storage medium may be a ROM, a random access memory (RAM), a CD-ROM, a magnetic tape, a floppy disk, an optical data storage device, etc.

The terminal may be configured to implement the above-mentioned method for determining a contention window, for example the method for determining a contention window illustrated in FIG. 2, FIG. 4, FIG. 6, FIG. 8, FIG. 9, and FIG. 10.

Figure 15:
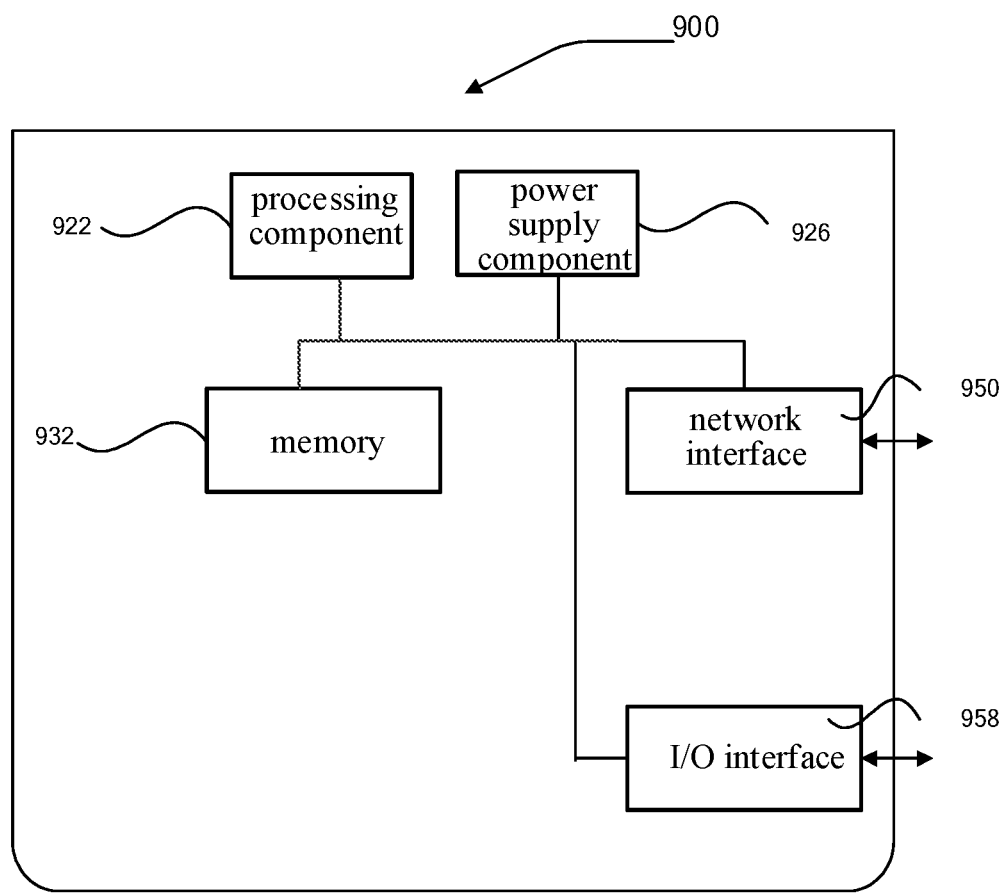
FIG. 15 is a block diagram illustrating a base station according to an embodiment.

FIG. 15 is a block diagram illustrating a base station according to an embodiment. The base station 900 may be provided as a network device. As illustrated in FIG. 15, the base station 900 includes a processing component 922, which further includes one or more processors, and a memory resource represented by a memory 932, for storing instructions that may be executed by the processing component 922, such as an application program. The application program stored in the memory 932 may include one or more modules each corresponding to a set of instructions. In addition, the processing component 922 is configured to execute instructions to execute the aforementioned method for determining a contention window, for example the method for determining a contention window illustrated in FIG. 2, FIG. 4, FIG. 6, FIG. 8, FIG. 9, and FIG. 10.

The base station 900 may also include a power supply component 926 configured to perform power management of the base station 900, a wired or wireless network interface 950 configured to connect the base station 900 to a network, and an input output (I/O) interface 958. The base station 900 may operate based on an operating system stored in the memory 932, such as a Windows Server™, a Mac OS X™, a Unix™, a Linux™, a FreeBSD™ or the like.

The wireless network interface 950 includes, but is not limited to, the antenna of the aforementioned communication device.

Those skilled in the art will easily think of other embodiments of the present disclosure after considering the specification and practicing the present disclosure. This application is intended to cover any variations, uses, or adaptive changes of the present disclosure. These variations, uses, or adaptive changes follow the general principles of the present disclosure and include common knowledge or conventional technical means in the technical field not disclosed in the present disclosure. The description and the embodiments are only regarded as exemplary, and the true scope and spirit of the present disclosure are pointed out by the appended claims.

It should be understood that the present disclosure is not limited to the precise structure that has been described above and shown in the drawings, and various modifications and changes may be made without departing from its scope. The scope of the present disclosure is only limited by the appended claims.

What is claimed is:

1. A method for determining a contention window, performed by a base station or a user equipment, comprising:
   obtaining a code block group (CBG) based hybrid automatic repeat request (HARQ) feedback information within a predetermined time period, wherein the CBG based HARQ feedback information comprises a non-acknowledge identifier (NACK) and an acknowledge identifier (ACK);
   determining a ratio of the NACK in the CBG based HARQ feedback information; and
   determining a contention window size (CWS) of a random access contention window on an unlicensed frequency band based on the ratio;
   wherein the ratio is determined based on a coefficient used to represent a proportion of transmission block (TB) based HARQ feedback and the CBG based HARQ feedback in a statistical result.

2. The method of claim 1, wherein the method further comprises:
   determining a first number of the CBG based HARQ feedback information received within the predetermined time period;
   determining a second number of the NACK; and
   determining the ratio of the second number to the first number.

3. The method of claim 1, wherein the ratio comprises a second ratio obtained based on the CBG based HARQ feedback information.

4. The method of claim 3, further comprising:
   determining the CWS of the random access contention window on the unlicensed frequency band based on the second ratio.

5. A communication device, comprising:
   a processor; and
   a non-transitory computer-readable storage medium storing a program to be executed by the processor, the program including instructions to:
   obtain a code block group (CBG) based hybrid automatic repeat request (HARQ) feedback information within a predetermined time period, wherein the CBG based HARQ feedback information comprises a non-acknowledge identifier (NACK) and an acknowledge identifier (ACK);
   determine a ratio of the NACK in the CBG based HARQ feedback information; and
   determine a contention window size (CWS) of a random access contention window on an unlicensed frequency band based on the ratio;
   wherein the ratio is determined based on a coefficient used to represent a proportion of transmission block (TB) based HARQ feedback and the CBG based HARQ feedback in a statistical result.

6. The device of claim 5, wherein the program including instructions to:
   determine a first number of the CBG based HARQ feedback information received within the predetermined time period;
   determine a second number of the NACK; and
   determine the ratio of the second number to the first number.

7. The device of claim 5, wherein the ratio comprises a second ratio obtained based on the CBG based HARQ feedback information.

8. The device of claim 7, wherein the program including instructions to:
    determine the CWS of the random access contention window on the unlicensed frequency band based on the second ratio.

9. A non-transitory computer-readable storage medium having processor-executable instructions stored thereon, wherein the processor-executable instructions, when executed, facilitate performance of the following:
    obtaining a code block group (CBG) based hybrid automatic repeat request (HARQ) feedback information within a predetermined time period, wherein the CBG based HARQ feedback information comprises a non-acknowledge identifier (NACK) and an acknowledge identifier (ACK);
    determining a ratio of the NACK in the CBG based HARQ feedback information; and
    determining a contention window size (CWS) of a random access contention window on an unlicensed frequency band based on the ratio;
    wherein the ratio is determined based on a coefficient used to represent a proportion of transmission block (TB) based HARQ feedback and the CBG based HARQ feedback in a statistical result.

10. The storage medium of claim 9, wherein the instructions facilitate performance of the following:
    determining a first number of the CBG based HARQ feedback information received within the predetermined time period;
    determining a second number of the NACK; and
    determining the ratio of the second number to the first number.

11. The storage medium of claim 9, wherein the ratio comprises a second ratio obtained based on the CBG based HARQ feedback information.

12. The storage medium of claim 11, wherein the instructions facilitate performance of the following:
    determining the CWS of the random access contention window on the unlicensed frequency band based on the second ratio.

* * * * *